United States Patent [19]
Wolf

[11] 3,857,152
[45] Dec. 31, 1974

[54] TOOTHED COUPLING FOR ROTATABLE MEMBERS

[75] Inventor: Albin Wolf, Augsburg, Germany

[73] Assignee: Zahnraderfabrik Renk AG, Augsberg, Germany

[22] Filed: Jan. 2, 1974

[21] Appl. No.: 429,764

Related U.S. Application Data

[62] Division of Ser. No. 241,550, April 6, 1972, Pat. No. 3,803,872.

[52] U.S. Cl. .................................. 29/159.2, 90/1
[51] Int. Cl. ............................................ B23p 15/14
[58] Field of Search ............ 29/159.2; 408/19; 64/9; 74/410, 411; 90/1; 279/9

[56] References Cited
UNITED STATES PATENTS

| | | | |
|---|---|---|---|
| 247,258 | 9/1881 | Locke | 408/19 |
| 2,906,143 | 9/1959 | Musser | 29/159.2 |
| 3,281,925 | 11/1966 | Hanna | 29/159.2 |
| 3,383,756 | 5/1968 | Smirl | 29/159.2 |

*Primary Examiner*—Lowell A. Larson
*Attorney, Agent, or Firm*—Karl F. Ross; Herbert Dubno

[57] ABSTRACT

A toothed (spline) coupling for torque transmission between rotatable members comprises a sleeve formed as an internal gear (toothed body) snugly receiving an externally toothed wheel. The teeth of the sleeve define a pitch annulus deviating from the circular and which coincides with the pitch circle of the inner externally toothed gear in three locations equispaced around the coupling's rotation axis (i.e., at angles of 120°). Except at these three locations the pitch annulus of the sleeve lies outside the inner gear's pitch circle. In this manner only three teeth of the inner gear fit snugly into the splines of the sleeve. On application of torque to the coupling the sleeve deforms and most of the teeth of the gear fit into the splines for best torque transmission. It is also possible to form the gear wheel with three teeth lying on a pitch circle and all of its other teeth lying slightly inside this circle. In such an arrangement the teeth and splines are spaced at up to 60° from one another.

5 Claims, 8 Drawing Figures

TOOTHED COUPLING FOR ROTATABLE MEMBERS

This is a division of application Ser. No. 241,550, filed Apr. 6, 1972, now U.S. Pat. No. 3,803,872.

FIELD OF THE INVENTION

The present invention relates to a gear coupling and to a method of making this coupling as well as to a tool used in making the coupling. More specifically this invention concerns a coupling for use in connecting a high-speed motor or transmission output shaft to a rotary load.

BACKGROUND OF THE INVENTION

A drive shaft is often provided with a gear wheel fitted into an internal gear carried on a driven shaft. In order to fit the two together it is necessary to provide a certain degree of play between the two gears. As the rotation speed rises, however, this play becomes more and more disadvantageous since a slight shifting of the two gears relative to each other causes their centers of mass to shift from the rotation axis, thereby creating a good deal of throw. At increased speeds, therefore, the play gives rise to vibration or oscillation of the parts as a consequence of the imbalances.

For heavy-duty use it is necessary to harden the teeth of the gears. Hardening the teeth increases their size by causing them to swell and thereby makes it more difficult to fit the two toothed bodies together, since the play allowed is minimal. Providing a larger amount of play has proven similarly unworkable in many cases since the shape changes caused by the various hardening and finishing operations often cannot be predicted exactly.

For the externally toothed wheel there is little difficulty in producing exact precision. Many methods, such as grinding, are known which produce extremely accurate external teeth on gear wheels. However the production of the same tolerances in internal gears has generally been considered impossible since the only good method of making such gears is by the generating principle with pinion-cutting and shaping or with a single-point rack-tooth-cutter.

Internally toothed gears so produced are nitrided in order to reduce the mechanical finishing of the teeth which may be required. The nitriding process has the advantage of very low tendency to deform the workpiece, but also has the disadvantage that the surfaces grow (outer portions more, inner hollow portions less) according to the thickness of the nitride coating. Since stresses are present in the nitride coating the internal gear or sleeve deforms depending on the thickness of the nitrided surfaces. Even is all of the deformations are small they add up to an often unacceptable deformation of the gear as a whole.

The maximum amount of play is felt to be substantially 0.02 mm. This has been achieved in spite of all of the above-given difficulties by first producing the internal gear, which may or may not be hardened. This gear is then measured and a gear wheel is produced which just fits the internal gear. Thereafter the two are fitted together and spun for proper counterbalancing, with the externally toothed gear being previously independently balanced. Thereafter the slight play is added by machining. This is, obviously, a very expensive method of producing a coupling. In addition the two gears are mated so that, for instance, a motor carrying the externally toothed gear cannot be used with a plurality of internally toothed ring gears.

OBJECTS OF THE INVENTION

It is therefore an object of the present invention to provide an improved coupling of the above-described general type.

Another object is an improved method of making such a coupling.

Yet another object is the provision of a tool for carrying out the improved method.

SUMMARY OF THE INVENTION

These objects are attained according to the present invention in a toothed coupling wherein at least one of the gears or wheels is formed with an array of teeth, three of which are snugly engageable with teeth of the array on the other gear in only one angular position of the two gears relative to each other. In this position all of the other teeth of the one gear lie out of contact with the teeth of the other gear. The term "gear" is used to represent a toothed wheel, splined sleeve or any other toothed body.

Clearly since the three teeth are adapted to fit without play into the other gear there is no difficulty of balancing the coupling. One of the gears, according to this invention, is elastically deformable on application of torque to the coupling so that this gear deforms and more than the three teeth engage snugly for best energy transmission.

When both of the gears are formed in this manner they may have their three bearing teeth offset by up to 60° to each other when interengaged. Elastic deformation on application of torque will bring most if not all of the teeth into engagement with each other.

The outwardly toothed gear may be conventionally made with high accuracy, and only the internal gear surrounding it formed according to the present invention with three bearing teeth defining a pitch circle lying on the pitch circle of the outwardly toothed gear wheel. The other teeth of the internal gear sleeve lie outside of this pitch circle. or at least the pitch arcs of these teeth lie outside this pitch circle.

Such a coupling is made according to the present invention by deforming a cylindrical sleeve when it is internally machined to provide it with teeth. This deformation is applied at three locations around the circumference of the elastically deformable sleeve or ring by a collar which is fit over the sleeve and which is provided at three angularly equispaced locations with means for applying pressure inwardly against the sleeve to deform it.

Such an internal gear can also be formed by a generating-principle cutter which is rotated about a eccentric axis and has only one-third as many teeth as the internal gear is to have. In this manner as it rolls around the inside of the sleeve it will cut teeth, or splines of different depths thereby forming the desired shape in the sleeve.

Since only three teeth need be dealt with in the machining operation, it is possible to form vibration-free couplings which can be interchanged for use of one drive element with any of a number of driven elements.

DESCRIPTION OF THE DRAWING

The above and other objects, features, and advan-

SPECIFIC DESCRIPTION

Figure 1:
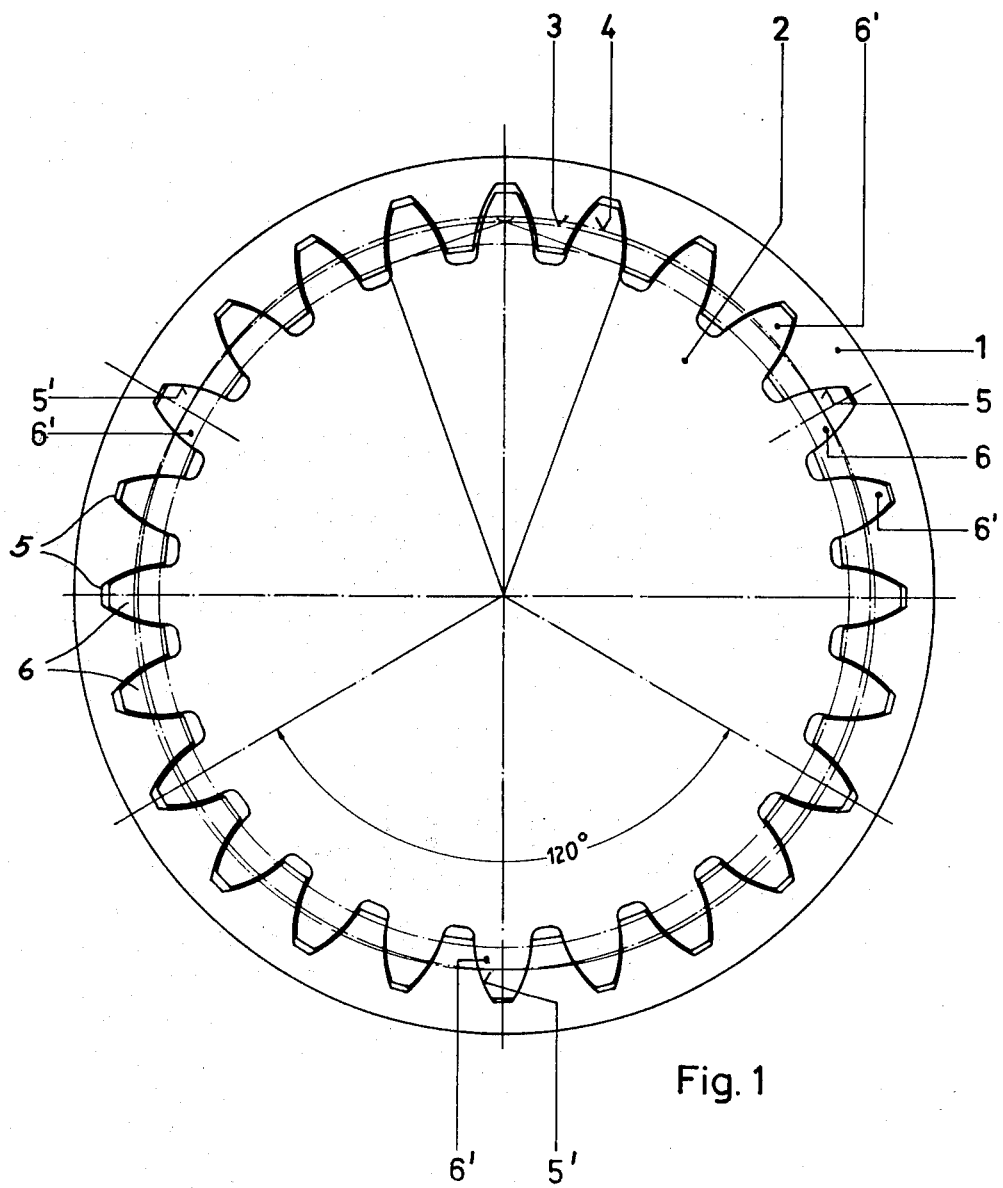
FIG. 1 is an end view of a coupling according to the present invention.
Figure 7:
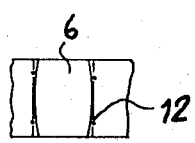
FIG. 7 is a top view of a gear tooth according to the present invention.

As seen in FIG. 1 an externally toothed gear 2 is received within an internal gear sleeve 1. The gear 2 has spur-gear teeth 6 which define a perfectly circular pitch circle 3 which is centered on the rotation axis A for the two gears 1 and 2. The gear 1, however, has inwardly directed teeth defining notches or grooves 5 which in turn define a noncircular pitch annulus 4 lying generally outside the pitch circle 3 and on the circle 3 at three locations spaced apart by 120°. The grooves 5 are shaped to mate perfectly with the teeth 6, with only three equispaced teeth 6' snugly received within the corresponding groove 5'. When torque is applied to the coupling 1, 2 the outer gear 1 which is made of steel will deform and teeth 6'' adjoining the teeth 6' will fit themselves snugly into grooves 5'' adjoining the grooves 5' and thereafter the adjoining teeth and grooves will fit together in the same manner. It is possible upon application of considerable torque that all the teeth 6 will seat in their corresponding grooves 5. Nonetheless when the coupling is at rest it is easy to pull apart since only three teeth are really engaged. FIG. 7 shows how the teeth 6 are chamfered at their ends to allow for easy fitting-together of the coupling 1,2. The flanks of the grooves 5 are straight and parallel, as shown by dot-dash lines 12 of FIG. 7.

Figure 5:
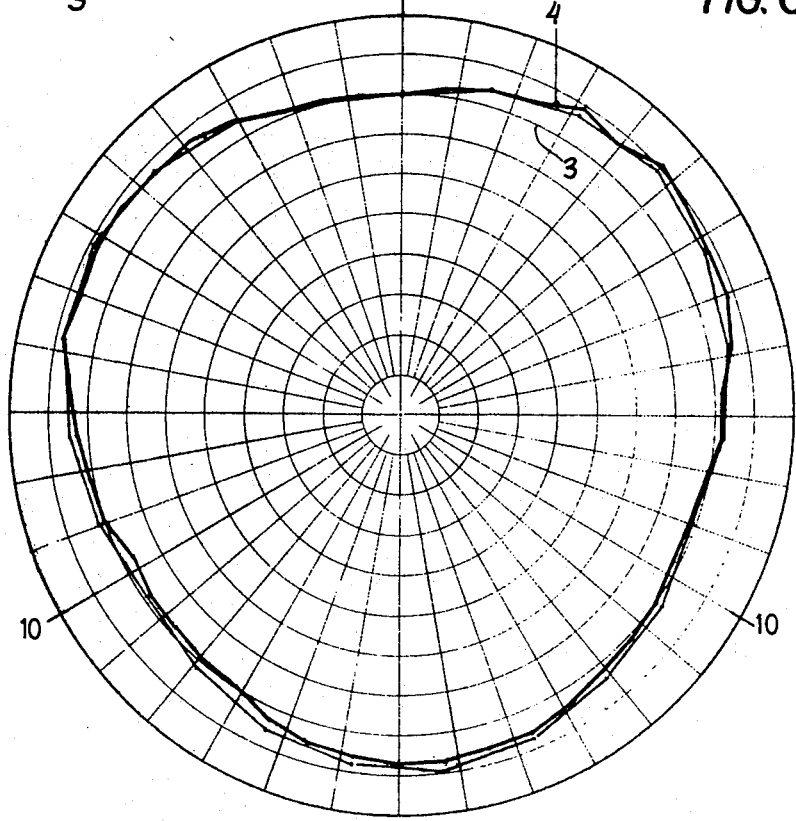
FIG. 5 is a diagram illustrating the dimensions of the coupling of FIG. 1.

FIG. 5 shows in exaggerated fashion the variation of the pitch annul of the coupling according to the present invention. One can see how along radial lines 10 corresponding to the positions of notches 5 the pitch circle 4 is closest to the center. The other teeth are therefore further out from this center. This polar chart represents two sets of empirically taken measurements which are inevitably not completely accurate.

Figure 6:
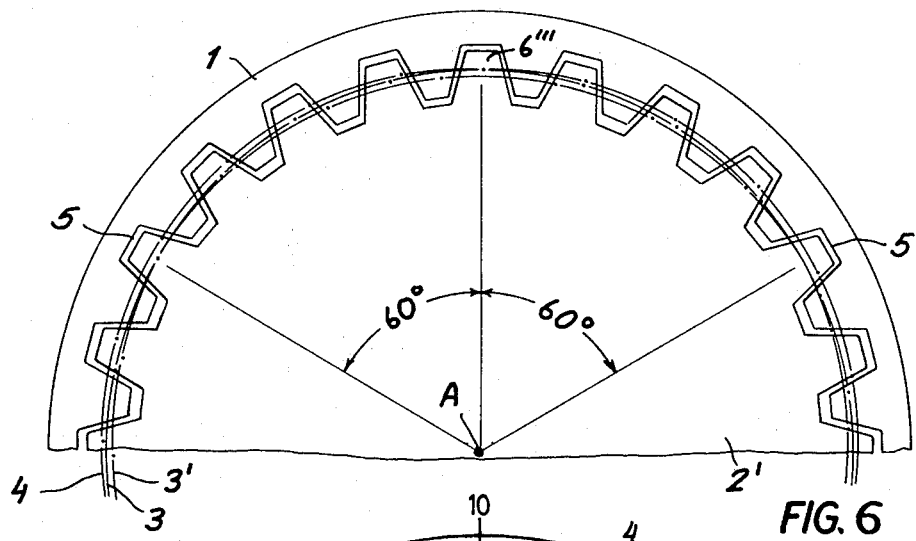
FIG. 6 is an end view similar to FIG. 1 illustrating an alternative embodiment of the present invention.

FIG. 6 shows a pair of coupling elements 1 and 2', the former of which is identical to the sleeve described above and the latter of which is formed with teeth 6 which do not define a circular pitch circle but which define a pitch annulus 3' which only coincides with the imaginary circle 3 at three teeth 6'''. These teeth 6''' are, in addition, offset from the notches 5 by 60°. In this arrangement is it extremely easy to fit the two elements 1 and 2' together, and one torque is applied the two elements will deform and fit together perfectly.

In the prior-art arrangements the shape of the elements, one made deliberately bigger than the other, made it impossible to fit together even should they deform, and such deformation was avoided by building the gears extremely robustly. Any possible deformation would bring the two gears together to one side of the axis, thereby shifting their center of gravity from the rotation axis and thereby unbalancing the coupling. In the coupling according to the present invention, deformation will take place to bring the two into snug contact at several regions, three at least although more is possible, spaced around the rotation axis to eliminate any chance of unbalancing. The three or more teeth adapted to it snugly in this manner are dimensioned such that they alone can carry the requisite torque, even though when the torque level rises more teeth and grooves will come into play.

Figure 2:
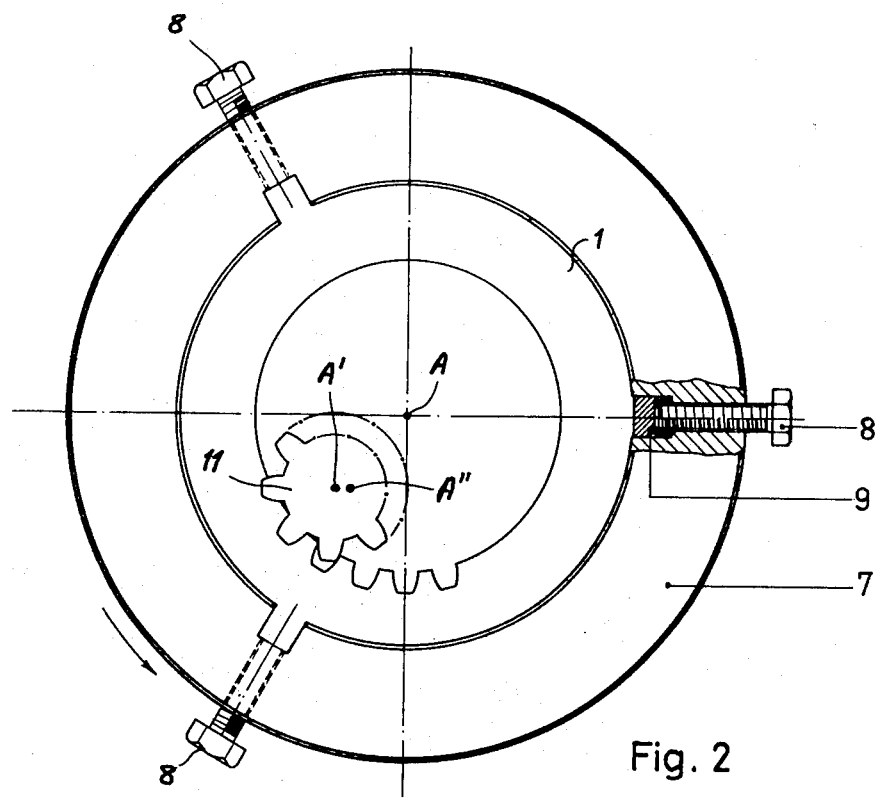
FIG. 2 is an end view illustrating how the sleeve gear of FIG. 1 is formed.
Figure 3:
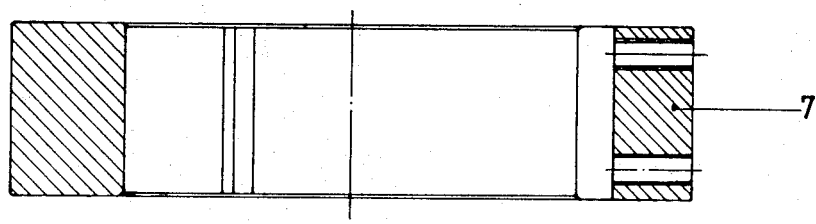
FIG. 3 is a section taken along line III—III of FIG. 2.
Figure 4:
FIG. 4 is a longitudinal section through a detail of FIG. 2.

FIGS. 2–4 show how the gear 1 according to the present invention is made. First of all a blank 1' is spanned in a positioning head 7 which is a collar of very heavy construction made of steel. This collar 7 is provided at three locations equispaced around it with a radially displaceable pressure block 9 formed with two seats 13 adapted to receive the ends of two bolts 8 which are threaded in the collar 7 and which can be rotated to displace the respective block 9 radially relative to the axis A. These three blocks 9 are tightened against the blank 1' to deform it slightly, with the regions of the blank 1' under each block 9 being deflected radially inwardly.

Thereafter the collar 9 is fitted into an indexing head and a pinion cutter 11 is used to cut out or simply finish-machine the grooves 5 inside the blank 1' according to principles described on pages 13-94 to 13-95 of Mechanical Engineers' Handbook edited by Theodore Baumeister (McGraw-Hill; New York 1958).

This pinion cutter 11 is rotated about its central axis A' in which case the deformations caused by the collar 9 alone suffice to produce deeper grooves at certain sections than at others. It is important that the extent of variation of the pitch annulus 4 from the pitch circle 3 exceed the normal variations due to machining tolerances.

Alternately it is possible to provide a pinion-cutter 11 which, as also shown in FIG. 2, has one-third as many teeth as the internal gear 1 to be formed. This cutter is rotated about an axis A'' which is offset from its center so that even if the blank 1' is not deformed the desired shape will be imparted to its inner periphery. The effect of rotation axis A'' A' from center A' is adjustable to allow one to determine the variation in depth from the deepest to the shallowest grooves.

Figure 8:
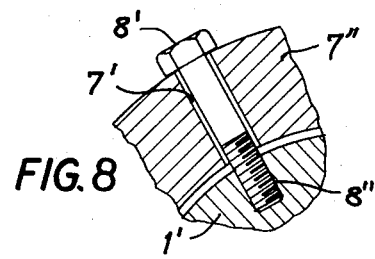
FIG. 8 is a view corresponding to a detail of FIG. 2 and showing an alternative method according to the present invention.

FIG. 8 shows how instead of the bolts 8 which exert a radially inward pressure against the blank 1', it is possible to provide bolts 8' which pass through unthreaded radial bores 7' in a collar 7'' and are threaded into bores 8'' formed in the blank 1'. As the bolt 8' is rotated it exerts a radially outward force on the blank 1' so the finished internal gear 1' will have its deepest grooves 5 located under the bolts 8' rather than between the bolts 8 of FIG. 2.

The chamfers formed on the gear teeth may be produced by wobbling the cutter 11 as it is reciprocated back and forth along its axis A' or A''. It is also possible to use a hob to form these teeth.

Although reference is made above to gear teeth it would be more appropriate to refer to the formations as involute splines, were it not for the chamfers which are never provided on splines. A pressure angle or flank angle of 30° is used. Although in the formation shown even when the internal and external splines interfit completely the crests of the external splines or teeth do not engage the roots of the internal spines or grooves, since these crests are flattened off as is usual in spur gears. Such a formation allows a slight misalignment of the rotation axes of the driving and driven members. It is possible to provide perfectly matable gears without departing from the scope of the present invention.

I claim:

1. A method of making a gear comprising the steps of:
    elastically deforming a circular blank to impart a noncircular shape thereto;
    machining teeth in the deformed blank in a circular array; and
    restoring said blank to its original shape whereby said circular array of teeth becomes noncircular.

2. The method defined in claim 1 wherein said blank is a ring, said ring being elastically deformed by exertion of pressure on its external periphery.

3. A tool for machining a gear from an annular blank comprising:
    a rigid collar surrounding said blank;
    at least three radially dispaceable elements in said collar; and
    means for displacing said elements against said blank and thereby deforming same.

4. The tool defined in claim 3 wherein said elements are spaced at 120° around the inner periphery of said collar.

5. The tool defined in claim 4 wherein said means includes at least three screws threadedly received in said collar and bearing radially on respective elements.

* * * * *